US012395821B2

(12) United States Patent
Sun et al.

(10) Patent No.: US 12,395,821 B2
(45) Date of Patent: Aug. 19, 2025

(54) COMMUNICATION METHOD AND APPARATUS

(71) Applicant: HUAWEI TECHNOLOGIES CO., LTD., Shenzhen (CN)

(72) Inventors: Haiyang Sun, Beijing (CN); Hui Ni, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 412 days.

(21) Appl. No.: 18/158,095

(22) Filed: Jan. 23, 2023

(65) Prior Publication Data
US 2023/0164591 A1 May 25, 2023

Related U.S. Application Data

(63) Continuation of application No. PCT/CN2021/091342, filed on Apr. 30, 2021.

(30) Foreign Application Priority Data

Jul. 24, 2020 (CN) .......................... 202010724961.2

(51) Int. Cl.
H04W 4/50 (2018.01)
H04W 8/22 (2009.01)
(Continued)

(52) U.S. Cl.
CPC .............. *H04W 4/50* (2018.02); *H04W 8/22* (2013.01); *H04W 24/02* (2013.01); *H04W 28/12* (2013.01);
(Continued)

(58) Field of Classification Search
CPC .. H04L 12/14–1407; H04M 15/61–66; H04M 15/82–8292; H04W 4/00–90;
(Continued)

(56) References Cited

U.S. PATENT DOCUMENTS

2022/0150678 A1* 5/2022 Zhang ..................... H04W 4/50

FOREIGN PATENT DOCUMENTS

| CN | 110536282 A | 12/2019 |
| CN | 112312466 A | 2/2021 |
| WO | 2020035357 | 2/2020 |

OTHER PUBLICATIONS

China Mobile et al, "KI#3, New Solution: Local NEF Deployment for network information exposure to Local AF with Low Latency", 3GPP TSG-SA WG2 Meeting #139E 82-2003771, Jun. 12, 2020, total 4 pages. (Year: 2020).*

(Continued)

*Primary Examiner* — Timothy J Weidner
(74) *Attorney, Agent, or Firm* — HAUPTMAN HAM, LLP

(57) ABSTRACT

A communication method and a communication apparatus. A session management function receives indication information from a policy control function, where the indication information indicates the session management function to send an identifier of a user plane function to the policy control function, and the user plane function is configured to transmit data of a first service. The session management function sends the identifier of the user plane function to the policy control function based on the indication information. The identifier of the user plane function is sent to the policy control function via the session management function, so that the policy control function is able to obtain the identifier of the user plane function to implement information exposure of the user plane function.

20 Claims, 6 Drawing Sheets

(51) Int. Cl.
  *H04W 24/02* (2009.01)
  *H04W 28/12* (2009.01)
  *H04W 64/00* (2009.01)
  *H04W 76/11* (2018.01)
  *H04W 84/02* (2009.01)
  *H04W 88/18* (2009.01)
  *H04W 92/02* (2009.01)

(52) U.S. Cl.
  CPC .......... *H04W 64/003* (2013.01); *H04W 76/11* (2018.02); *H04W 84/02* (2013.01); *H04W 88/18* (2013.01); *H04W 92/02* (2013.01)

(58) Field of Classification Search
  CPC ..... H04W 8/005–30; H04W 24/02–10; H04W 28/02–26; H04W 36/0005–385; H04W 40/005–38; H04W 48/02–20; H04W 60/005–06; H04W 64/003–006; H04W 76/10–50; H04W 84/005–22; H04W 88/005–188; H04W 92/02–24
  See application file for complete search history.

(56) References Cited

OTHER PUBLICATIONS

3GPP TR 23.748 V0.4.0 (Jun. 2020), 3rd Generation Partnership Project; Technical Specification Group Services and System Aspects; Study on enhancement of support for Edge Computing in 5G Core network (5GC) (Release 17), 184 pages. (Year: 2020).*

China Mobile. et al., "KI#3 New Solution: Local NEF Deployment for network information exposure to Local AF with Low Latency.", 3GPP TSG-SA WG2 Meeting #139E S2-2003771., Jun. 12, 2020, total 4 pages.

Huawei. et al., "Solution for the KI#3: Network Information Provisioning to EAS with low latency.", 3GPP TSG-WG SA2 Meeting #139E e-meeting S2-2004119., Jun. 12, 2020, total 3 pages.

Huawei. et al., "Solution for the KI#3: Network Information Provisioning to EAS with low latency.", 3GPP TSG-WG SA2 Meeting #139E e-meeting S2-2004432., Jun. 12, 2020, total 3 pages.

International Search Report issued in corresponding International Application No. PCT/CN2021/091342, dated Jul. 14, 2021, pp. 1-16.

3rd Generation Partnership Project; Technical Specification Group Services and System Aspects;System architecture for the 5G System (5GS);Stage 2(Release 16) 3GPP TS 23.501 V16.4.0 (Mar. 2020) total:430pages.

3rd Generation Partnership Project; Technical Specification Group Services and System Aspects;Policy and charging control framework for the5G System (5GS);Stage 2(Release 16),3GPP TS 23.503 V16.4.1 (Apr. 2020),total:115pages.

3GPP TR 23.748 V0.4.0 (Jun. 2020), 3rd Generation Partnership Project; Technical Specification Group Services and System Aspects; Study on enhancement of support for Edge Computing in 5G Core network (5GC)(Release 17), 184 pages.

Extended European Search Report issued in corresponding European Application No. 21845308.2, dated Nov. 16, 2023, pp. 1-10.

* cited by examiner

COMMUNICATION METHOD AND APPARATUS

CROSS-REFERENCE TO RELATED APPLICATIONS

This application is continuation of International Application No. PCT/CN2021/091342, filed on Apr. 30, 2021, which claims priority to Chinese Patent Application No. 202010724961.2, filed on Jul. 24, 2020. The disclosures of the aforementioned applications are hereby incorporated by reference in their entireties.

TECHNICAL FIELD

Embodiments of this application relate to the field of communication technologies, and in particular, to a communication method and an apparatus.

BACKGROUND

Rapid development of mobile communication promotes continuous emergence of various new services. In addition to conventional mobile broadband and the internet of things, mobile communication spawns many new application fields such as augmented reality (AR)/virtual reality (VR), the internet of vehicles, industrial control, or the internet of things (IoT). The new application fields also impose higher requirements on performance such as network bandwidth and a latency.

To effectively meet requirements: high bandwidth and a low latency needed by rapid development of the mobile internet and the internet of things, a mobile edge computing (MEC) technology is proposed in the industry. The MEC may be regarded as a cloud server that runs on an edge of a wireless network and performs a specific task. In a MEC scenario, both a user plane function (UPF) network element and an application server (AS) in a data network (DN) are locally deployed, but a control plane network element is usually deployed in a central equipment room.

In the scenario in which the UPF and the DN are locally deployed, a network device sends information to the control plane network element, and the information reaches the local AS via the control plane network element. If an existing control plane exposure solution is used, the low latency requirement cannot be met.

SUMMARY

Embodiments of this application provide a communication method and an apparatus, to implement local capability exposure.

According to a first aspect, a communication method is provided. The communication method may include the following steps: A session management function receives indication information from a policy control function, where the indication information indicates the session management function to send an identifier of a user plane function to the policy control function, and the user plane function is configured to transmit data of a first service. The session management function sends the identifier of the user plane function to the policy control function based on the indication information. In this way, the identifier of the user plane function can be sent to the policy control function via the session management function, so that the policy control function can obtain the identifier of the user plane function. This can help implement information exposure of the user plane function.

The following provides two possible manners in which the session management function receives the indication information of the policy control function.

In a possible design, the session management function receives a policy and charging control PCC rule corresponding to the first service from the policy control function, where the PCC rule includes the indication information.

In a possible design, the policy control function may alternatively send a subscription message to the session management function, where the subscription message may request to subscribe to a policy control event, and the subscription request includes a cause value or an event type of the policy control event. The cause value or event type may include a change in the user plane function. After receiving the subscription message from the policy control function, the session management function sends a notification message to the policy control function when a policy control event notification condition is met. The notification message may include the identifier of the user plane function.

Optionally, the subscription message may also be referred to as a policy control request trigger (PCR trigger). The policy control request trigger indicates the session management function to trigger, when the user plane function changes, sending of the identifier of the user plane function to the policy control function.

According to a second aspect, a communication method is provided. The communication method may include the following steps: A session management function receives indication information from a policy control function, where the indication information indicates exposure of information about a first service, the information about the first service is from a user plane function, and the user plane function is configured to transmit data of the first service. The session management function sends an identifier of a first local network exposure function to the user plane function or sends an identifier of the user plane function to the first local network exposure function based on the indication information, where the first local network exposure function is configured to expose the information about the first service to a first local application function corresponding to the first service. In this way, the session management function may send the identifier of the first local network exposure function to the user plane function or send the identifier of the user plane function to the first local network exposure function according to an indication of the policy control function, so that the user plane function and the local network exposure function are associated, thereby further helping implement exposure of information about the user plane function to the first local application function via the first local network exposure function.

The indication information may indicate that local capability exposure is performed at a PDU session granularity, a service granularity, or a service data flow granularity. The local capability exposure is to send, to a local application function via a local network exposure function, information from a local user plane function. The information about the local user plane function may be at the PDU session granularity, the service granularity, or the service data flow granularity.

Optionally, the session management function receives, from the policy control function, policy information related to a PDU session, where the policy information is information at the PDU session granularity. Assuming that the first user plane function is configured to transmit a first PDU session, the session management function can send an identifier of a first user plane function to the policy control function according to the policy information related to the first PDU session and the indication information.

In a possible design, the session management function determines the first local network exposure function based on first information, where the first information includes one or more of the following: a location of a terminal device, a data network access identifier DNAI, an identifier of the user plane function, a service area of the user plane function, or a service area of the first local network exposure function.

In a possible design, the session management function receives a first correspondence from the policy control function, where the first correspondence includes a correspondence between the local application function and the local network exposure function. The session management function determines, based on the first correspondence, the first local network exposure function corresponding to the first local application function.

In a possible design, the method further includes: The session management function receives the identifier of the first local network exposure function from the policy control function.

In a possible design, if the session management function sends the identifier of the first local network exposure function to the user plane function, the method further includes: the session management function sends, to the user plane function, an identifier of a PDU session or an identifier of an N4 session corresponding to the PDU session; or if the session management function sends the identifier of the user plane function to the first local network exposure function, the method further includes: the session management function sends, to the first local network exposure function, an identifier of a PDU session or an identifier of an N4 session corresponding to the PDU session. Subsequently, the local NEF exposes information related to the PDU session to the local AF, to implement local capability exposure at the PDU session granularity.

In a possible design, the identifier of the first local NEF includes address information of the first local network exposure function. For example, the address information may be an internet protocol (IP) address of the first local NEF or a fully qualified domain name (FQDN) of the local NEF.

According to a third aspect, a communication method is provided. The method is implemented by performing the following steps: A local network exposure function receives first information, where the first information includes an identifier of a user plane function, and the user plane function is configured to transmit data of a first service. The local network exposure function sends a request message to the user plane function based on the first information, where the request message requests to establish an association between the local network exposure function and the user plane function, and the local network exposure function is configured to expose information about the first service to a local application function corresponding to the first service. By establishing the association between the local network exposure function and the user plane function, information from the user plane function can be exposed to the local application function via the local network exposure function. For example, radio access network (RAN) information is transmitted to the local user plane function, the local user plane function sends the RAN information to the local network exposure function, and the local network exposure function sends the RAN information to the local application function, so that a path function exposure on a control plane is shortened. In addition, due to mobility of a terminal device, an anchor user plane function for transmitting a service may change. In this case, the local network exposure function selected before the terminal device moves is no longer appropriate. When service data is transmitted, the association between the local user plane function and the local network exposure function is established, so that an appropriate local network exposure function can be selected to perform local function exposure.

In a possible design, the local network exposure function receives the information about the first service from the user plane function, and the local network exposure function sends the information about the first service to the local application function.

In a possible design, the first information further includes an identifier of a PDU session or an identifier of an N4 session corresponding to the PDU session, and the PDU session is used by the user plane function to transmit the data of the first service. The local network exposure function can determine, based on the identifier of the PDU session or the identifier of the N4 session corresponding to the PDU session, a PDU session for which capability exposure or information exposure needs to be performed.

In a possible design, the local network exposure function may receive the first information from a policy control function or a session management function.

According to a fourth aspect, a communication apparatus is provided. The communication apparatus may be a session management function, may be an apparatus in the session management function (for example, a chip, a chip system, or a circuit), or may be an apparatus that may be used together with the session management function. In a design, the communication apparatus may include modules that are in a one-to-one correspondence with the methods/operations/steps/actions described in the first aspect. The module may be implemented by a hardware circuit, software, or a combination of the hardware circuit and the software. In a design, the communication apparatus may include a processing module and a communication module. The processing module is configured to invoke the communication module to perform a receiving function and/or a sending function. The communication module may include a receiving module and a sending module. For example, the receiving module is configured to receive indication information from a policy control function, where the indication information indicates the apparatus to send an identifier of a user plane function to the policy control function, and the user plane function is configured to transmit data of a first service; and the sending module is configured to send the identifier of the user plane function to the policy control function based on the indication information.

In a possible design, the receiving module is specifically configured to receive a policy and charging control PCC rule corresponding to the first service from the policy control function, where the PCC rule includes the indication information.

In a possible design, the receiving module is specifically configured to receive a policy control request trigger from the policy control function, where the policy control request trigger indicates the apparatus to trigger, when the user plane function changes, sending of the identifier of the user plane function to the policy control function.

For beneficial effects of the fourth aspect, refer to the relevant descriptions of the first aspect. Details are not described herein.

According to a fifth aspect, a communication apparatus is provided. The communication apparatus may be a session management function, may be an apparatus in the session management function (for example, a chip, a chip system, or a circuit), or may be an apparatus that may be used together with the session management function. In a design, the communication apparatus may include modules that are in a one-to-one correspondence with the methods/operations/steps/actions described in the second aspect. The module may be implemented by a hardware circuit, software, or a combination of the hardware circuit and the software. In a design, the communication apparatus may include a processing module and a communication module. The processing module is configured to invoke the communication module to perform a receiving function and/or a sending function. The communication module may include a receiving module and a sending module. For example, the receiving module receives indication information from a policy control function, where the indication information indicates exposure of information about a first service, the information about the first service is from a user plane function, and the user plane function is configured to transmit data of the first service; and the sending module sends an identifier of a first local network exposure function to the user plane function or sends an identifier of the user plane function to the first local network exposure function based on the indication information, where the first local network exposure function is configured to expose the information about the first service to a first local application function corresponding to the first service.

In a possible design, the processing module is configured to determine the first local network exposure function based on first information, where the first information includes one or more of the following: a location of a terminal device, a data network access identifier DNAI, an identifier of the user plane function, a service area of the user plane function, or a service area of the first local network exposure function.

In a possible design, the receiving module is further configured to receive a first correspondence from the policy control function, where the first correspondence includes a correspondence between a local application function and a local network exposure function. The processing module is further configured to determine, based on the first correspondence, the first local network exposure function corresponding to the first local application function.

In a possible design, the receiving module is further configured to receive the identifier of the first local network exposure function from the policy control function.

In a possible design, if the sending module sends the identifier of the first local network exposure function to the user plane function, the sending module is further configured to send, to the user plane function, an identifier of a PDU session or an identifier of an N4 session corresponding to the PDU session; or if the sending module sends the identifier of the user plane function to the first local network exposure function, the sending module is further configured to send, to the first local network exposure function, an identifier of a PDU session or an identifier of an N4 session corresponding to the PDU session.

In a possible design, the identifier of the first local NEF includes address information of the first local network exposure function.

For beneficial effects of the fifth aspect, refer to the relevant descriptions of the second aspect. Details are not described herein.

According to a sixth aspect, a communication apparatus is provided. The communication apparatus may be a local network exposure function, may be an apparatus in the local network exposure function (for example, a chip, a chip system, or a circuit), or may be an apparatus that may be used together with the local network exposure function. In a design, the communication apparatus may include modules that are in a one-to-one correspondence with the methods/operations/steps/actions described in the third aspect. The module may be implemented by a hardware circuit, software, or a combination of the hardware circuit and the software. In a design, the communication apparatus may include a processing module and a communication module. The processing module is configured to invoke the communication module to perform a receiving function and/or a sending function. The communication module may include a receiving module and a sending module. For example, the receiving module is configured to receive first information, where the first information includes an identifier of a user plane function, and the user plane function is configured to transmit data of a first service; the sending module is configured to send a request message to the user plane function based on the first information, where the request message requests to establish an association between the local network exposure function and the user plane function; and the apparatus is configured to expose information about the first service to a local application function corresponding to the first service.

In a possible design, the receiving module is further configured to receive the information about the first service from the user plane function, and the sending module is further configured to send the information about the first service to the local application function.

In a possible design, the first information further includes an identifier of a PDU session or an identifier of an N4 session corresponding to the PDU session, and the PDU session is used by the user plane function to transmit the data of the first service.

In a possible design, the receiving module is configured to receive the first information from a policy control function or a session management function.

For beneficial effects of the sixth aspect, refer to the relevant descriptions of the third aspect. Details are not described herein.

According to a seventh aspect, a communication apparatus is provided. The communication apparatus includes a communication interface and a processor. The communication interface is used by the communication apparatus to communicate with another device, for example, to send and receive data or a signal. For example, the communication interface may be a transceiver, a circuit, a bus, a module, or a communication interface of another type. The processor is configured to invoke a group of programs, instructions, or data to perform the method according to the first aspect or the second aspect. The communication apparatus may further include a memory, configured to store the programs, the instructions, or the data invoked by the processor. The memory is coupled to the processor. When executing the instructions or the data stored in the memory, the processor can implement the methods described in the first aspect and the second aspect.

According to an eighth aspect, a communication apparatus is provided. The communication apparatus includes a communication interface and a processor. The communication interface is used by the communication apparatus to communicate with another device, for example, to send and receive data or a signal. For example, the communication interface may be a transceiver, a circuit, a bus, a module, or a communication interface of another type. The processor is configured to invoke a group of programs, instructions, or data, to perform the method according to the third aspect. The communication apparatus may further include a memory, configured to store the programs, the instructions, or the data invoked by the processor. The memory is coupled to the processor. When executing the instructions or the data stored in the memory, the processor can implement the method described in the third aspect.

According to a ninth aspect, an embodiment of this application further provides a computer-readable storage medium. The computer-readable storage medium stores computer-readable instructions. When the computer-readable instructions are run on a computer, the methods according to the first aspect and the second aspect are performed.

According to a tenth aspect, an embodiment of this application further provides a computer-readable storage medium. The computer-readable storage medium stores computer-readable instructions. When the computer-readable instructions are run on a computer, the method according to the third aspect is performed.

According to an eleventh aspect, an embodiment of this application provides a chip system. The chip system includes a processor, may further include a memory, and is configured to implement the method according to the first aspect or the second aspect. The chip system may include a chip, or may include the chip and another discrete component.

According to a twelfth aspect, an embodiment of this application provides a chip system. The chip system includes a processor, may further include a memory, and is configured to implement the method according to the third aspect. The chip system may include a chip, or may include the chip and another discrete component.

According to a thirteenth aspect, an embodiment of this application provides a communication system. The communication system includes the apparatus according to the first aspect or the second aspect, and further includes the apparatus according to the third aspect.

According to a fourteenth aspect, a computer program product including instructions is provided. When the computer program product is run on a computer, the method according to the first aspect or the second aspect is performed.

According to a fifteenth aspect, a computer program product including instructions is provided. When the computer program product is run on a computer, the method according to the third aspect is performed.

DESCRIPTION OF EMBODIMENTS

Embodiments of this application provide a communication method and an apparatus, to establish an association between a UPF and a local NEF, so that information from the UPF is exposed to a local AF via the local NEF.

The method and the apparatus are conceived based on a same or similar technical concept. The method and the apparatus have similar principles for resolving the problems. Therefore, for implementation of the apparatus and the method, refer to each other. Details of repeated parts are not described. In descriptions of embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. In this application, "at least one" means one or more, and "a plurality of" means two or more. In addition, it should be understood that, in the descriptions of this application, terms such as "first", "second", and "third" are merely used for distinguishing and description, but should not be understood as an indication or implication of relative importance, or should not be understood as an indication or implication of a sequence. Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "contain", "have", and their variants all mean "include but are not limited to", unless otherwise specifically emphasized in another manner.

A reference signal indication method provided in embodiments of this application may be applied to a 5th generation (5G) communication system, for example, 5G new radio (NR), or may be applied to various future communication systems, for example, a 6th generation (6G) communication system.

The following describes in detail embodiments of this application with reference to the accompanying drawings.

Figure 1:
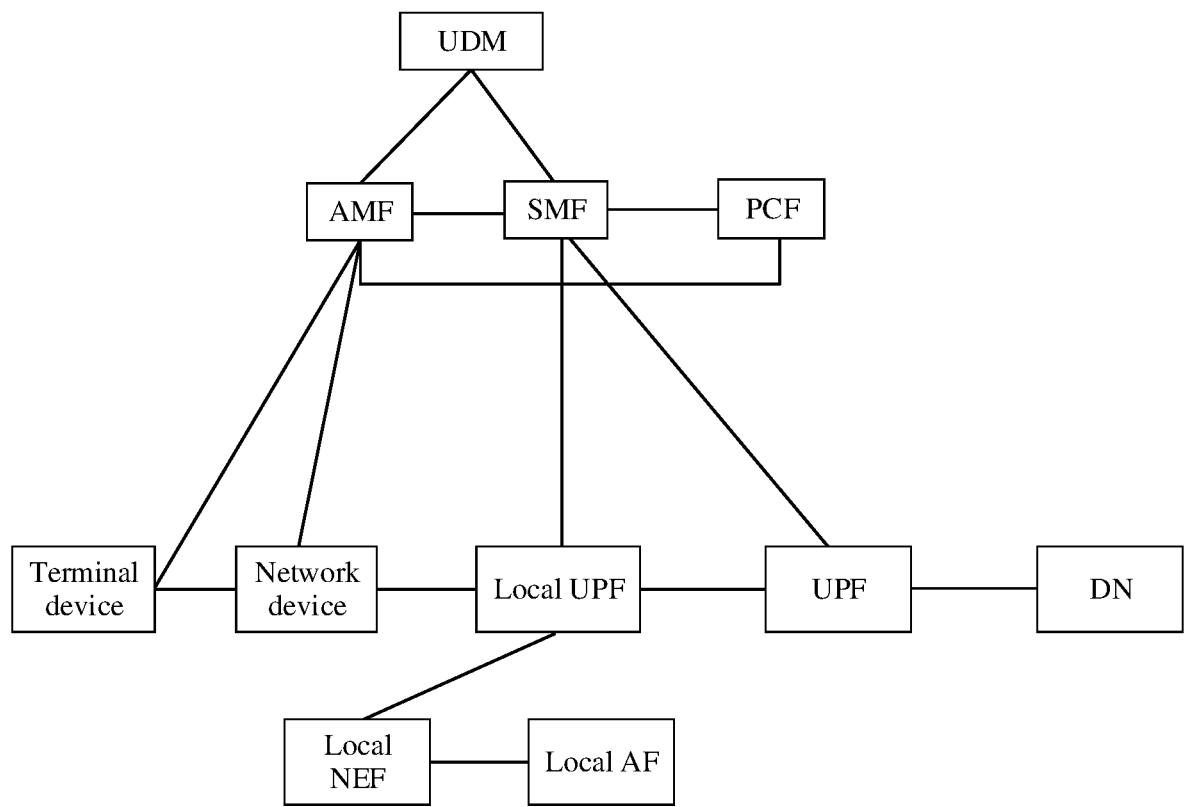
FIG. 1 is a schematic diagram of an architecture of a communication system according to an embodiment of this application.

FIG. 1 shows an architecture of a communication system to which a communication method according to an embodiment of this application is applicable. The communication system may include a session management function (SMF), a policy control function (PCF), a local network exposure function (NEF), a local UPF, and a local application function (AF). The local UPF performs local offloading or splitting on existing core network data, and moves a remote data network down to the local. The local AF may have an AF function in the core network. The local AF can be integrated with an AS in the local DN to provide an application service. In addition to a function of controlling the AF, the local AF may also have an AS function. That is, the local AF in this embodiment of this application may alternatively be an AF network element that integrates the AS function. Certainly, the local AF in this embodiment of this application may alternatively be an AS integrating the AF function. Alternatively, the AF and the AS may be independently deployed. In this scenario, the local AF in this embodiment of this application may include an AF network element and/or an AS. The AF network element performs a control plane interaction procedure, and the AS performs a user plane interaction procedure. A unified description is provided herein, and details are not described below. The local NEF is configured to expose a function of the local UPF to the local AF.

Optionally, the communication system may further include function entities such as unified data management (UDM), an access and mobility management function (AMF), an AF, a UPF, a DN, a terminal device, or a network device.

Functions may be connected through an interface. A sequence number of the interface or a name of the interface is not limited in this embodiment of this application. An interface defined in a 3GPP-related standard protocol of the 5G system may be used, or an interface in a future communication system may be used. For example, the terminal device communicates with the AMF through a next generation network (next generation, N) 1 interface (N1 for short), the network device communicates with the AMF through an N2 interface (N2 for short), the network device communicates with the local UPF through an N3 interface (N3 for short), the local UPF communicates with the UPF through the N9 interface (N9 for short), and the UPF communicates with the DN through the N6 interface (N6 for short). The AMF communicates with the SMF through an N11 interface (N11 for short), the AMF communicates with the UDM through an N8 interface (N8 for short), the AMF communicates with the PCF through an N15 interface (N15 for short), the SMF communicates with the PCF through an N7 interface (N7 for short), the SMF communicates with the UPF and the local UPF through an N4 interface (N4 for short), the PCF network element communicates with the AF network element through an N5 interface (N5 for short), and the SMF communicates with the UDM through the N10 interface (N10 for short).

In addition, it should be noted that the functions or network elements may alternatively interact with each other through a service-oriented interface. For example, an external service-oriented interface provided by the AMF may be Namf, an external service-oriented interface provided by the SMF may be Nsmf, an external service-oriented interface provided by the UDM may be Nudm, an external service-oriented interface provided by the PCF may be Npcf, an external service-oriented interface provided by the AUSF may be Nausf, and an external service-oriented interface provided by the AF may be Naf. For related descriptions, refer to a 5G system architecture in the standard 23501. Details are not described herein.

The functions included in the communication system may also be referred to as function entities, network elements, or other names. For example, the SMF may be referred to as an SMF entity. Optionally, each function in this embodiment of this application may be implemented by one device, may be jointly implemented by a plurality of devices, or may be implemented by one or more function modules in one device. This is not specifically limited in this embodiment of this application. It may be understood that the functions in this embodiment of this application may be network elements in a hardware device, may be software functions running on dedicated hardware, a combination of hardware and software, or a virtualization function instantiated on a platform (for example, a cloud platform).

It should be noted that a distribution form of each function is not limited in this embodiment of this application. Optionally, each function may alternatively include another function entity formed by combining any plurality of functions, for example, a function entity that has two functions: session management and policy control, a function entity that has three functions: session management, access and mobility management, and policy control, or a function entity that has two functions: network exposure and application.

Optionally, the terminal device in this embodiment of this application may be a device configured to implement a wireless communication function, for example, a terminal or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device in this embodiment of this application is a device that accesses the core network. For example, the network device may be a base station, a broadband network gateway (BNG), an aggregation switch, or a non-3rd generation partnership project (3GPP) access device. There may be various forms of base stations, for example, a macro base station, a micro base station (also referred to as a small cell), a relay station, and an access point.

It should be noted that the communication system shown in FIG. 1 does not constitute a limitation on a communication system to which embodiments of this application are applicable. The architecture of the communication system shown in FIG. 1 may be a non-roaming 5G system architecture. Optionally, the method in this embodiment of this application is further applicable to a roaming 5G system architecture and to various future communication networks.

Each function or device in this embodiment of this application may also be referred to as a communication apparatus, and may be a general-purpose device or a dedicated device. This is not specifically limited in this embodiment of this application.

In FIG. 1, the local NEF is represented by using a dotted line, because an association between the local UPF and the local NEF needs to be established before the local NEF exposes a function of the local UPF to the local AF. Before the association between the local UPF and the local NEF is established, the local UPF cannot know a specific local NEF via which function exposure is performed. It is assumed that a local UPF 1 is connected to a local NEF 1 through an interface. At a moment, a function of the local UPF 1 is exposed to a local AF 1 via the local NEF 1. In a MEC scenario, an anchor UPF for service transmission may change due to movement of the terminal device. When the anchor UPF changes (where it is assumed that the local UPF 1 changes to a local UPF 2), function exposure of the local UPF 2 may not be performed via the local NEF 1 because the local UPF 2 and the local UPF 1 are deployed at different places. In this case, the local NEF selected for function exposure of the local UPF is no longer appropriate. Therefore, how to select an appropriate local NEF to establish an association with the local UPF becomes an urgent problem to be resolved.

The communication method provided in embodiments of this application can help establish the association between the local NEF and the local UPF, to promote implementation of a solution in which the function of the local UPF is exposed to the local AF via the local NEF.

The following describes in detail the communication method provided in embodiments of this application with reference to the accompanying drawings.

First, a concept of function exposure in embodiments of this application is described. The function exposure can be implemented via a local NEF. The function exposure may also be referred to as information exposure. In embodiments of this application, exposure of a function of a local UPF to a local AF may also be described as exposure of information from the local UPF to the local AF. Specifically, the local UPF sends obtained information to the local NEF, and the local NEF sends the information received from the local UPF to the corresponding local AF. For example, the local UPF obtains, from a network device, quality of service (QoS) information such as quality of service notification control (QNC) or QoS monitoring information. The local UPF sends the QoS information obtained from the network device to the local NEF, and the local NEF sends the QoS information to the corresponding local AF.

Figure 2:
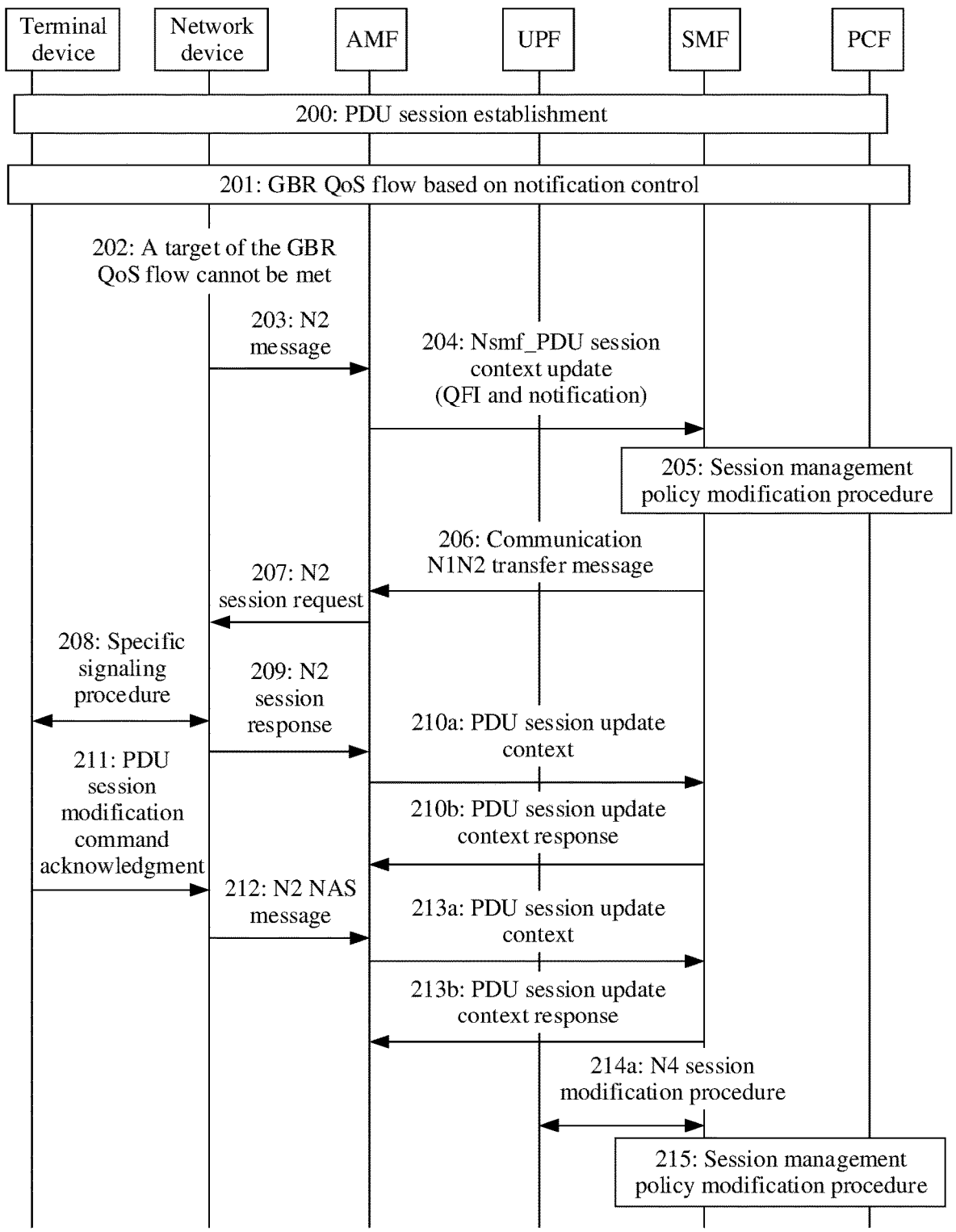
FIG. 2 is a schematic diagram of a control procedure of a GBR QoS flow that is based on notification control according to an embodiment of this application.

In a possible implementation, information of a network device needs to reach a local AF via a control plane network element deployed in a central equipment room. QNC is used as an example. As shown in FIG. 2, a control procedure of a guaranteed bit rate (GBR) QoS flow (flow) that is based on notification control is described as follows.

S200: A terminal device establishes a protocol data unit (PDU) session with a network.

S201: The terminal device establishes a GBR QoS flow that is based on notification control with the network.

S202: After a period of time, a network device detects that a QoS target of the GBR QoS flow cannot be met, and a configuration of the GBR QoS flow includes the notification control.

S203: The network device sends an N2 message to an AMF.

The N2 message includes an identifier (identity, ID) of the PDU session and N2 session management (SM) information. The N2 SM information includes a QoS flow identifier (QFI), indicating that a QoS target of the QoS flow cannot be met.

S204: The AMF sends an Nsmf_PDU session context update message (Nsmf_PDUSessionUpdateSMContext) to an SMF, where the message includes the QFI and a notification (notification).

S205: After the SMF receives the indication, when dynamic policy and charging control (PCC) is used for the PDU session, and the PCF has subscribed to an indication of an event that the QoS target of the GBR QoS flow is not met, the SMF executes a session management policy modification procedure to report the event.

The PCF may further report the event to an AF, and make a policy decision based on a feedback from the AF. When the dynamic PCC is not used for a data network name (DNN), the SMF determines, according to a local policy, to initiate a session modification flow.

S206: The SMF sends a communication N1N2 transfer message (Namf_Communication_N1N2MessageTransfer) to the AMF, where the message includes the N2 SM information and an N1 SM container.

When the SMF determines to delete the GBR QoS flow, the N2 SM information includes the ID of the PDU session and the QFI. The N1 SM container contains the ID of the PDU session, an affected QoS rule, and a corresponding QoS rule operation (namely, deletion).

When the SMF determines to modify the GBR QoS flow, the N2 SM information includes the ID of the PDU session, the QFI, and a QoS profile. The N1 SM container contains the ID of the PDU session, the affected QoS rule, and the corresponding QoS rule operation (for example, deletion or modification).

S207: The AMF sends an N2 session request to the network device, where the request includes the N2 SM information received from the SMF and a NAS message. The NAS message includes the ID of the PDU session and the N1 SM container.

S208: The network device performs a network device-specific signaling procedure with the terminal device based on the information received from the SMF.

For example, when a 3GPP network device is accessed, RRC connection reconfiguration is performed between the terminal device and the network device to modify a corresponding network device resource.

S209: The network device sends an N2 session response to the AMF, where the N2 session response includes the N2 SM information.

S210a: The AMF uses a PDU session update context (Nsmf_PDUSession_UpdateSMContext) service operation, where the service includes the N2 SM information.

S210b: The SMF sends an Nsmf_PDUSession_UpdateSMContext response to the AMF.

S211: The terminal device sends the NAS message in response to a PDU session modification command, where the NAS message includes the ID of the PDU session and the N1 SM container, and the N1 SM container is a PDU session modification command acknowledgment (ACK).

S212: The network device forwards the NAS message to the AMF.

S213a: The AMF forwards the N1 SM container to the SMF by using the Nsmf_PDUSession_UpdateSMContext.

S213b: The SMF sends the Nsmf_PDUSession_UpdateSMContext response to the AMF.

S214: The SMF and the UPF perform a PDU session modification procedure.

S215: The SMF and the PCF perform a session management policy modification procedure, and the SMF notifies the PCF whether a corresponding PCC rule is executed.

It can be learned from the procedure shown in FIG. 2 that QoS information of the network device needs to be sent to the AMF on the control plane, the AMF sends the information to the SMF, the SMF indicates the information to the PCF, and the PCF further reports the information to the AF. If the AF is locally deployed, the PCF further reports the information to the local AF. Similarly, after the AF provides a feedback, the AF also needs to send the feedback to the network device step by step via the control plane network elements. Because the control plane network elements are deployed in the central equipment room, the procedure shown in FIG. 2 cannot meet a low latency requirement.

Figure 3:
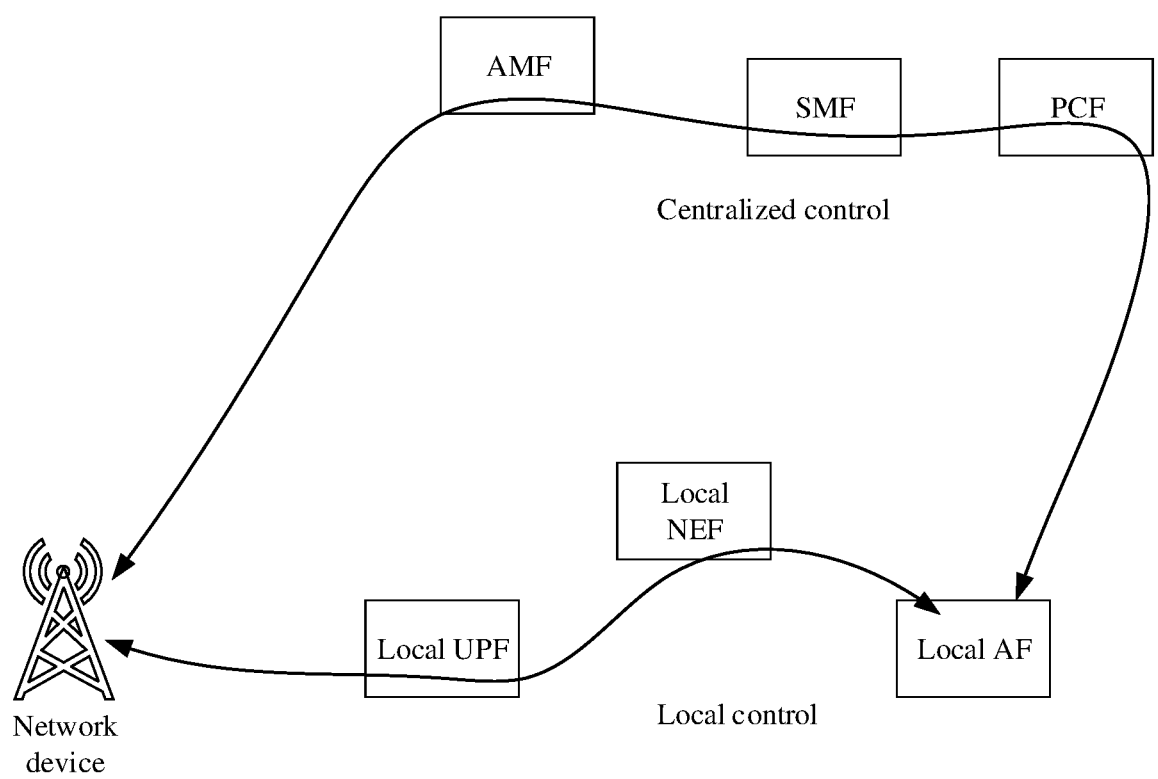
FIG. 3 is a schematic diagram of two exposure paths according to an embodiment of this application.

For better understanding of an exposure path in embodiments of this application, and for comparison with an exposure path in the method in FIG. 2, refer to a schematic diagram shown in FIG. 3. In FIG. 3, a centralized control path is used between a network device and a local AF, and a latency is high. For example, in the embodiment in FIG. 2, the network device implements the QNC through a centralized control path. This requires high latency.

In this embodiment of this application, a local control path is used between the network device and the local AF, and a local UPF, a local NEF, and the local AF are all deployed near the network device. This can significantly reduce the latency.

It should be noted that, in this embodiment of this application, the local NEF may be configured to expose any information from the UPF to the local AF, and the information from the UPF includes but is not limited to QoS information.

Figure 4:
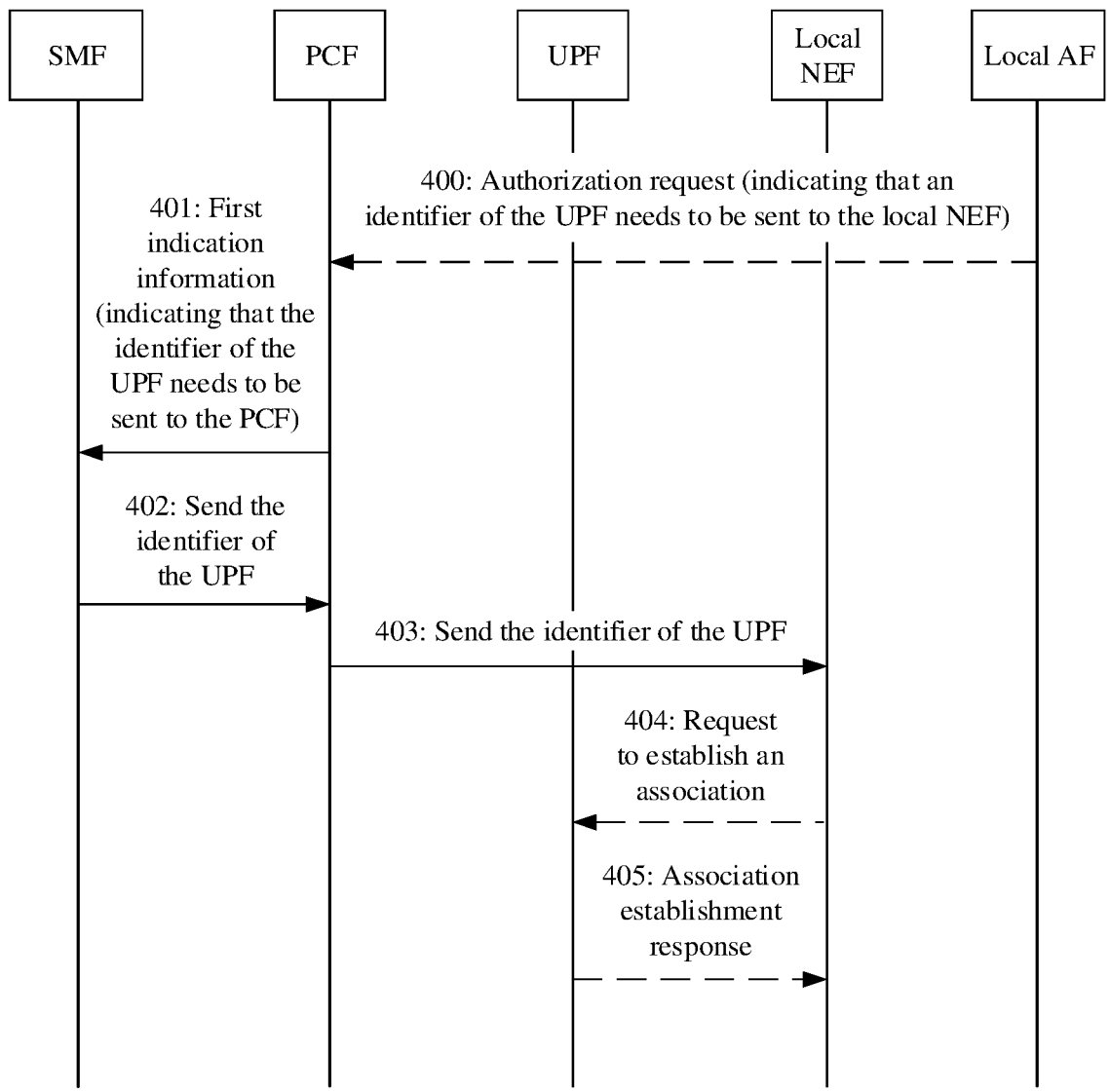
FIG. 4 is a schematic flowchart 1 of a communication method according to an embodiment of this application.

As shown in FIG. 4, a schematic flowchart of a communication method according to an embodiment of this application is described as follows.

S401: A PCF sends indication information to an SMF. For differentiation, the indication information may be denoted as indication information A. The SMF receives the indication information A from the PCF.

The indication information A indicates the SMF to send an identifier of a UPF to the PCF. The UPF is configured to transmit data of a first service.

During actual application, the UPF may provide a service for a PDU session of a terminal device, and the PDU session may be used for service data. The UPF may be a local UPF and locally deployed, and may be briefly described as a UPF in the following process of describing the embodiment.

A local AF is an AF corresponding to the first service.

S402: The SMF sends the identifier of the UPF to the PCF based on the indication information A, and the PCF receives the identifier of the UPF from the SMF.

The UPF is a UPF for transmitting the first service. Optionally, the UPF may be an anchor UPF (anchor UPF).

S403: The PCF sends the identifier of the UPF to a local NEF, and the local NEF receives the identifier of the UPF from the PCF.

The local NEF is configured to expose information from the UPF to a local AF corresponding to the first service. The information from the UPF may be, for example, QoS monitoring information or QoS notification information corresponding to the first service, or may be UE location information.

After receiving the identifier of the UPF, the local NEF establishes an association between the UPF and the local NEF.

Optionally, the local NEF may establish the association with the UPF by using the following method.

S404: The local NEF sends a request message to the UPF, where the request message requests to establish the association between the local NEF and the UPF, for example, requests to establish an N4 session, or the request message is carried in the N4 session. The UPF receives the request message from the local NEF.

S405: The UPF returns a response message to the local NEF, where the response message is used to respond to the request message in S404. The local NEF receives the response message from the UPF.

The local NEF and the UPF separately store the association between the local NEF and the UPF.

In this way, the UPF may send first information to the local NEF associated with the UPF.

For example, with reference to FIG. 3, the UPF receives the first information from the network device, the UPF sends the first information to the local NEF associated with the UPF, and the local NEF may send the first information to the local AF, to expose the information from the UPF to the local AF.

The following describes some possible implementations of the embodiment in FIG. 4 by using examples.

In S401, the PCF may send a policy and charging control (PCC) rule to the SMF, where the PCC rule includes the indication information A. The SMF receives the PCC rule from the PCF, and obtains the indication information A from the PCC rule. The PCC rule is corresponding to the first service. For example, the PCC rule may include an identifier of the first service, or the PCC rule includes information indicating the first service. The PCC rule may further include information about a service data flow (SDF) corresponding to the first service. After receiving the PCC rule, the SMF determines an identifier that needs to be reported and that is of the UPF transmitting the first service. For example, the terminal device has established a PDU session. The PDU session may be used to transmit the first service, the PDU session may be a session between the terminal device and the local AF, the local AF may include a function of a local AS, and the local AS may run the first service. The UPF provides a user-plane service for the PDU session. In this case, after receiving the PCC rule, the SMF may select a UPF for the first service corresponding to the PCC rule, and send, to the PCF, an identifier of the UPF corresponding to the PDU session for transmitting the first service. Further, the SMF may select a UPF for the service data flow corresponding to the PCC rule, and send, to the PCF, an identifier of the UPF corresponding to the PDU session for transmitting the service data flow.

In S401, the PCF may alternatively send a subscription message to the SMF, where the subscription message may request to subscribe to a policy control event, and the subscription request includes a cause value or an event type of the policy control event. The cause value or event type may include a change in the UPF. After receiving the subscription message from the PCF, the SMF sends a notification message to the PCF when a policy control event notification condition is met. The notification message may include the identifier of the UPF.

Optionally, the subscription message may also be referred to as a policy control request trigger (PCR trigger). The policy control request trigger indicates the SMF to trigger, when the UPF changes, sending of the identifier of the UPF to the PCF.

In S403, the PCF sends the identifier of the UPF to the local NEF. Further, the PCF may send, to the local NEF, an identifier of the PDU session or an identifier of an N4 session corresponding to the PDU session. The PDU session is used by the UPF to transmit the data of the first service. In this case, in S404 and S405, the local NEF and the UPF may establish an association for the PDU session. The PCF may obtain, from the SMF, the PDU session identifier corresponding to the PDU session or the identifier of the N4 session corresponding to the PDU session. The PDU session is used by the UPF to transmit the data of the first service. Subsequently, the local NEF exposes information related to the PDU session to the local AF. Alternatively, the PCF may further send the identifier of the first service to the local NEF, or the PCF sends service description information to the local NEF, where the service description information identifies the first service. In this case, in S404 and S405, the local NEF and the UPF may establish the association for the first service. Subsequently, the local NEF exposes information related to the first service to the local AF. If each local NEF serves only one service, the PCF does not need to send the identifier of the first service or the service description information.

In this embodiment of this application, the PCF may actively send the indication information A to the SMF in S401. Alternatively, before S401, the AF may send an authorization request to the PCF, and the PCF sends the indication information A to the SMF based on the authorization request received from the AF. Optionally, before S401, the method further includes S400.

S400: The AF sends the authorization request to the PCF, and the PCF receives the authorization request.

The AF may send the authorization request to the PCF via the local NEF, and the PCF receives the authorization request via the local NEF. The authorization request may be a request to authorize some requirements, for example, a request to authorize a QoS requirement.

The authorization request may include the service description information. The service description information identifies the first service, or may identify the service data flow of the first service.

The authorization request may further include indication information. To distinguish from the indication information A, the indication information herein is denoted as indication information A1. The indication information A1 indicates the PCF to send the identifier of the UPF to the local NEF.

Certainly, the AF may alternatively carry the service description information and/or the indication information A1 in another message. For example, the AF may interact with the PCF via a central NEF or directly interact with the PCF, and the PCF determines a local NEF corresponding to a service based on a configuration. For example, the PCF configures a correspondence between a service server address field and the local NEF.

In this embodiment of this application, both the indication information A and the indication information A1 may indicate that the local UPF needs to perform function exposure to the local AF.

In S404, the local NEF sends the request message to request to establish the association with the UPF. This may be implemented based on service invoking. For example, the local NEF may obtain event subscription information based on the authorization request received from the local AF in S401. For example, the event subscription information includes that the local UPF needs to perform function exposure to the local AF. The local NEF initiates, based on the event subscription information, a request to establish the association with the UPF.

Alternatively, in a possible implementation, the local NEF may obtain event subscription information from the local AF by interacting with the local AF, and initiate, based on the event subscription information, a request to establish the association with the UPF. For example, an N4 session may be established between the local NEF and the UPF by using the PFCP protocol (where for details, refer to 3GPP TS 29.244).

The request message in S404 may carry the event subscription information. The event subscription information may include any one or more of the following: a usage reporting rule (URR), a forwarding action rule (FAR), or a QoS information subscription indication. The foregoing information may indicate that a service flow that meets a condition needs to be forwarded to a corresponding local NEF, or indicate a type of QoS information that needs to be reported by the UPF. For example, a destination interface in the forwarding action rule (FAR) is the local NEF.

The request message in S404 may further carry service description information, and the service description information identifies the first service.

The service description information in this embodiment of this application may be any one or more of a packet filter, an application identifier, a service identifier, or a packet detection rule (PDR). In addition, the UPF may add a rule corresponding to new event subscription information to the PDR corresponding to the service description information. Alternatively, the UPF may add a new PDR and a rule corresponding to corresponding event subscription information.

The request message in S404 may further carry an identifier of the local NEF.

The request message in S404 may further carry association identification information, to identify the association established between the local NEF and the UPF.

The request message in S404 may further carry the identifier of the PDU session, to identify that the established association is an association corresponding to the PDU session. An operation related to the service description information is performed only in an N4 session context corresponding to the PDU session.

A trigger occasion for the local NEF to send the request message to the UPF in S404 may include the following manner. The local NEF may send a subscription event to the UPF. The subscription event may be that a notification message is received when a condition is met. For example, the condition may be that the UPF sends the notification message to the local NEF when the PDU session starts. Alternatively, the condition may be that the UPF sends the notification message to the local NEF when the first service is transmitted, the first application starts, or the data flow of the first service is transmitted. When receiving the notification message, the local NEF triggers step S404.

Optionally, before S401, a procedure for establishing the PDU session is further included. The procedure for establishing the PDU session may be initiated by the terminal device. The SMF selects a UPF in a PDU session establishment process, and the UPF provides a service for the PDU session.

Figure 5:
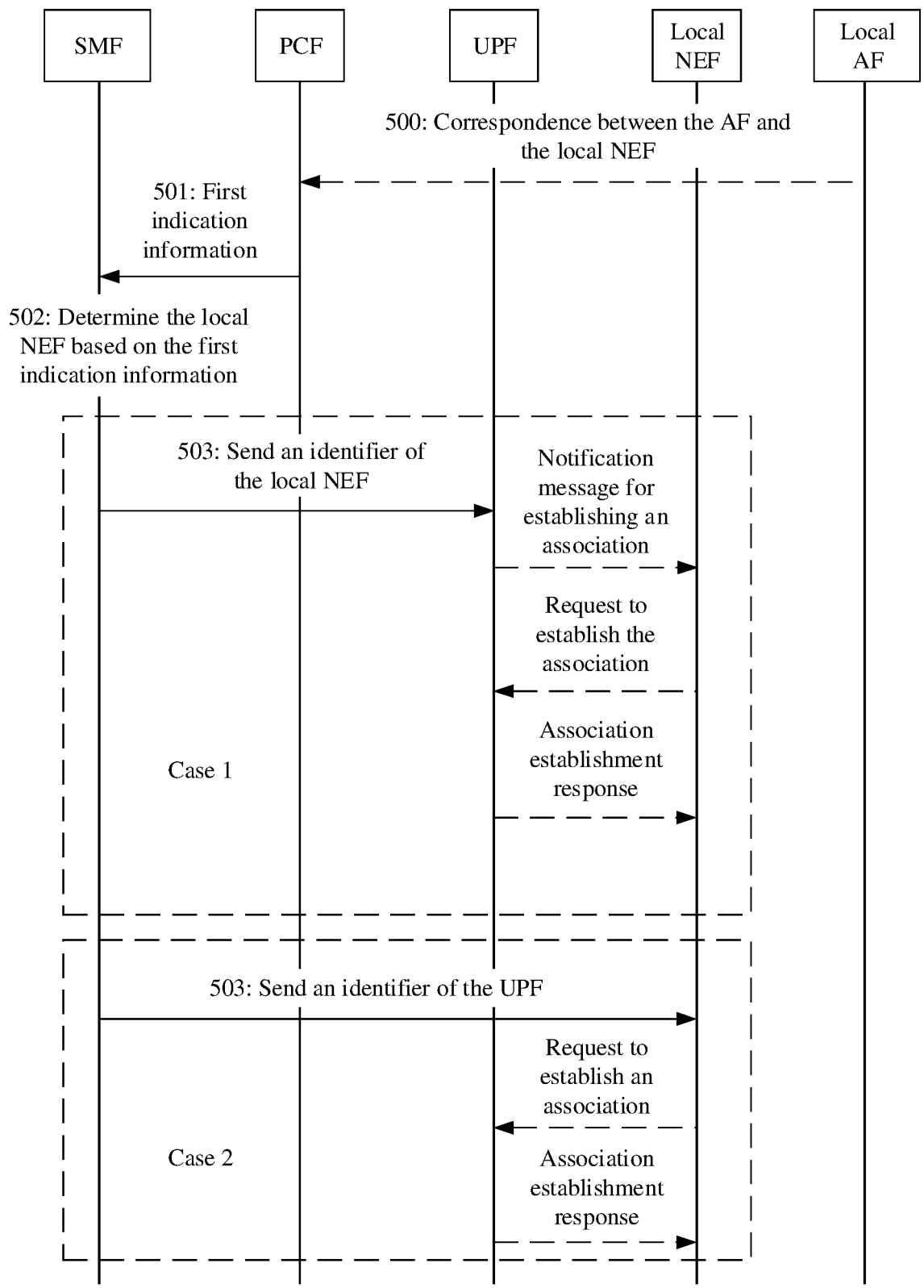
FIG. 5 is a schematic flowchart 2 of a communication method according to an embodiment of this application.

As shown in FIG. 5, a schematic flowchart of another communication method according to an embodiment of this application is described as follows.

S501: A PCF sends indication information to an SMF. The indication information may be denoted as indication information B. The SMF receives the indication information B from the PCF.

The indication information B may indicate to expose information about a first service. The information about the first service is from a local UPF, and the local UPF is configured to transmit data of the first service.

Alternatively, the indication information B may indicate that information from the UPF needs to be exposed to a local AF. The information from the UPF may be at a service granularity, a PDU session granularity, a terminal device granularity, or a service data flow granularity.

The local UPF may provide a service for a PDU session of a terminal device, and the PDU session may be used to transmit service data. The UPF may be briefly described as a UPF in the following process of describing this embodiment.

Optionally, before S501, a procedure for establishing the PDU session of the terminal device is completed.

The UPF is configured to provide a service for the PDU session of the terminal device, and the PDU session may be used to transmit the first service. The local AF provides the first service. The UPF may be the local UPF and locally deployed, and may be briefly described as a UPF in the following process of describing the embodiment.

The PCF may further send, to the SMF, policy information related to the PDU session, where the policy information is information at the PDU session granularity. For example, the PCF may send, to the SMF, policy information related to a first PDU session. The indication information B assumes that a first UPF is configured to transmit the first PDU session. The SMF determines, based on the policy information related to the first PDU session and the indication information B, that information that is related to the first PDU session and from the UPF needs to be exposed to the local AF.

Optionally, the PCF may further send an identifier of the first service to the SMF. For example, the identifier of the first service may be a service data flow filter or a service identifier. For example, the identifier of the first service may be carried in the indication information B, or the identifier of the first service may be sent in other information. The indication information B indicates that information that is related to the first service and from the UPF needs to be exposed to the local AF.

The indication information B may indicate that information that is at the PDU session granularity, the service granularity, or the service data flow granularity and from the UPF needs to be exposed to the local AF. It may be understood that the indication information B may alternatively provide an indication at another granularity.

S502: The SMF determines a local NEF based on the indication information B.

The local NEF is configured to expose information from the UPF to the local AF. Herein, the information from the UPF may be information about the first service or information about the PDU session. For example, the information from the UPF may be QoS monitoring information or QoS notification information corresponding to the first service, or may be UE location information.

For example, information exposure is performed at a service granularity, and the local NEF is configured to expose the information about the first service to the local NEF corresponding to the first service.

It is assumed that in S501, the PCF sends, to the SMF, the policy information related to the PDU session, where the policy information is information at the PDU session granularity. In this case, the SMF receives the policy information related to the PDU session from the PCF, and determines that the local NEF needs to be selected for the PDU session. In this way, the local NEF exposes information that is related to the PDU session and from the UPF to the corresponding local AF.

Similarly, it is assumed that in S501, the PCF sends the identifier of the first service to the SMF, for example, send the identifier by using a PCC rule, where the PCC rule includes the identifier of the first service and the indication information B. In this case, the SMF receives the identifier of the first service from the PCF, and determines that the local NEF needs to be selected for the first service. In this way, the local NEF exposes, to the local AF corresponding to the first service, information that is from the UPF and that is related to the first service.

Assuming that the PCF sends an identifier of a first service data flow to the SMF in S501, the SMF receives the identifier of the first service data flow from the PCF, and determines that the local NEF needs to be selected for the first service data flow. In this way, the local NEF exposes, to the local AF corresponding to the first service data flow, information that is from the UPF and that is related to the first service data flow.

Optionally, the SMF may determine the local NEF based on any one or more of the following information: a location of the terminal device, a data network access identifier (DN access identifier, DNAI), an identifier of the UPF, a service area of the UPF, or a service area of the local NEF. For example, the SMF uses the foregoing parameters as input to invoke a service of an NRF, and the NRF feeds back an NEF that meets a requirement. The NEF stores a correspondence between the parameters and the local NEF. For another example, the SMF internally configures a correspondence between the parameters and the local NEF, to determine the local NEF.

The SMF may obtain information about a plurality of local NEFs in advance, and select a local NEF from the plurality of local NEFs.

Optionally, the SMF reports an identifier (Local NEF ID) of the selected local NEF to the local AF. The identifier can be reported directly, reported via the PCF, or reported via the local NEF. The SMF may determine, based on the indication information B in S501, that reporting is required. Alternatively, the SMF may send identification information of the local AF to the local NEF after selecting the local NEF. The local NEF may interact with the local AF to obtain corresponding event subscription information.

S503: The SMF sends the identifier of the local NEF to the UPF, or the SMF sends the identifier of the UPF to the local NEF.

The identifier of the local NEF may be any information that can distinguish or identify the local NEF, for example, a local NEF ID, or an address of the local NEF, or may be an internet protocol (IP) address of the local NEF or a fully qualified domain name (FQDN) of the local NEF.

Assuming that the PCF sends policy information related to the PDU session to the SMF, and the policy information is information at the PDU session granularity, the SMF sends the identifier of the local NEF to a UPF serving the PDU session. Assuming that the PCF sends the identifier of the first service to the SMF, the SMF sends the identifier of the local NEF to a UPF serving the first service. Assuming that the PCF sends the identifier of the first service data flow to the SMF, the SMF sends the identifier of the local NEF to a UPF serving the first service data flow.

Similarly, assuming that the PCF sends policy information related to the PDU session to the SMF, and the policy information is information at the PDU session granularity, the SMF sends, to the local NEF, an identifier of the UPF transmitting the PDU session. Assuming that the PCF sends the identifier of the first service to the SMF, the SMF sends, to the local NEF, an identifier of a UPF serving the first service. Assuming that the PCF sends the identifier of the first service data flow to the SMF, the SMF sends, to the local NEF, an identifier of a UPF serving the first service data flow.

The SMF may send the identifier of the local NEF to the UPF in the following manner. The SMF may send the identifier of the local NEF to the UPF in a subscription manner. The SMF sends subscription information to the UPF, where the subscription information may include a PDR and a FAR. The subscription information indicates that data that meets a condition needs to be forwarded to the local NEF. The subscription information may alternatively include a PDR and a URR, and indicate that data that meets a condition needs to be forwarded to the local NEF. Herein, the data that meets the condition may include data at different granularities, for example, a PDU session meeting the condition, a first service meeting the condition, or a data flow of a first service meeting the condition. The granularity of the data may be the same as a granularity at which sending is performed by the PCF to the SMF in S501.

If the SMF sends the identifier of the local NEF to the UPF, after the UPF receives the identifier of the local NEF, the UPF sends a notification message to the local NEF, where the notification message indicates to establish an association. The notification message may include the identifier of the UPF, and may further include service description information. The service description information indicates the first service or the first service data flow, and may further include the PDU session identifier. When receiving the PDU session, the first service, or the first service data flow, the UPF may send the notification message to the local NEF, to trigger association establishment. The identifier of the UPF may be implicitly carried. To be specific, the UPF sends a request to the local NEF, and the local NEF knows the identifier (for example, an address of the UPF) of the UPF.

When the UPF changes, the SMF needs to deliver the preceding information to a new UPF, and the UPF sends an association establishment notification to the NEF. If the NEF does not need to change, the UPF may also update the association instead of re-establishing an association.

Case 1: If the SMF sends the identifier of the local NEF to the UPF, the UPF sends, to the local NEF, a notification message indicating to establish an association. After receiving the notification message used to establish the association from the UPF, the local NEF may establish the association between the UPF and the local NEF. Case 2: If the SMF sends the identifier of the UPF to the local NEF, after receiving the identifier of the UPF, the local NEF may establish an association between the UPF and the local NEF. Based on Case 1 and Case 2, optionally, for a method for establishing the association between the local NEF and the UPF, refer to related descriptions of S404 and S405. Details are not described herein again.

In a possible implementation, if the SMF sends the identifier of the local NEF to the UPF, the UPF may directly request the local NEF to establish the association. Specifically, the UPF may send a request message to the local NEF, to request to establish the association, and the local NEF receives the request message from the UPF. The local NEF returns a response message to the UPF, where the response message is used to respond to the request message. The UPF receives the response message from the local NEF. For this possible implementation, refer to the descriptions of S404 and S405, except that execution operations of the two network elements need to be exchanged.

The following describes some other optional implementations of the embodiment in FIG. 5 by using examples.

In S501, the PCF may actively send the indication information B to the SMF. Alternatively, before S501, the AF may send an authorization request to the PCF, and the PCF sends the indication information B to the SMF based on the authorization request received from the AF. Optionally, before S501, the method further includes S500. S500: The AF sends a correspondence to the PCF, and the PCF receives the correspondence.

The AF may send the authorization request to the PCF, where the correspondence is carried in the authorization request. The correspondence is used to describe a correspondence between an AF and a local NEF. For example, the correspondence may include a one-to-one correspondence between a plurality of AFs and a plurality of local NEFs. The correspondence may alternatively describe a local NEF corresponding to each AF, or may describe an AF corresponding to each local NEF.

Optionally, the correspondence may further describe a correspondence between an application and a local NEF. For example, the correspondence may include a one-to-one correspondence between a plurality of applications and a plurality of local NEFs. The correspondence may alternatively describe a local NEF corresponding to each application, or may describe an application corresponding to each local NEF. The application here is business-related. For example, the application is an internet of vehicles application, and the internet of vehicles application may run various services related to the internet of vehicles, for example, an internet of vehicles information collection service. The AF is a network element for running an application, or the AF is a network element that provides information related to the application.

Certainly, the correspondence may alternatively be a correspondence between a service and a local NEF. For example, the correspondence between the service and the local NEF may be represented by using a correspondence between service description information and the local NEF. The correspondence may alternatively be a correspondence between a DNAI and the local NEF.

The correspondence sent by the AF to the PCF may be a one-to-many relationship, a many-to-many relationship, or a many-to-one relationship. This is not limited in this application.

The AF may carry the correspondence in the authorization request, or may send the correspondence in other information. The PCF receives the authorization request or the other information, and obtains the correspondence from the authorization request or the other information.

In S500, the AF may send the correspondence to the PCF. Alternatively, the AF may send the correspondence to a UDR via a NEF in a core network, and the correspondence is stored in the UDR as application data or service data. After the PDU session is established, the PCF obtains the correspondence from the UDR. In this case, in S501, the PCF sends the indication information B to the SMF. The indication information B may indicate a plurality of local NEFs. The plurality of local NEFs all need to perform local capability exposure, and information from the UPF needs to be exposed to the local AF for local capability exposure. In S502, after receiving the indication information B from the PCF, the SMF obtains information about a plurality of local NEFs, and selects one local NEF from the plurality of local NEFs. A manner of selecting the local NEF may be based on a location of the terminal device, a data network access interface (DN access identifier, DNAI), an identifier of the UPF, a service area of the UPF, or a service area of the local NEF.

The AF may alternatively send the authorization request to the PCF via the local NEF. In this case, after receiving the authorization request via the local NEF, the PCF already determines that the local NEF needs to perform capability exposure.

The PCF may directly send an identifier of the determined local NEF to the SMF.

In a possible implementation, the UPF may obtain the foregoing correspondence, and autonomously select the local NEF to trigger association establishment. The correspondence may be configured on the UPF or obtained by the UPF from the SMF.

A device-level association may be established between the UPF and the NEF. The NEF and UPF separately store context information. In other words, the UPF may establish an association with the NEF only once. The UPF may trigger association establishment for the first time.

Certainly, if the association is a device-level association, the NEF may also obtain a correspondence between the identifier of the UPF and a data network access identifier (DN access identifier, DNAI), an identifier of the UPF, a service area of the UPF, a service area of the local NEF, a UE address field supported by the UPF, a UE address field obtained after NAT, an N6 tunnel identifier, or the like. The NEF directly establishes the association.

In this embodiment of this application, the UPF identifier may be any information that can distinguish or identify a UPF, for example, a UPF ID or a UPF address. The UPF address may be a UPF IP address or a UPF FQDN.

In this example of this application, the association between the local NEF and the UPF may not be required for each service data flow. A plurality of service data flows may share one association, for example, when UPFs that transmit these service data flows are the same. The UPF or the local NEF may determine whether the UPF or the local NEF can be reused. If the UPF or the local NEF can be reused, the UPF or the local NEF may initiate an association modification to update context stored in the UPF and the local NEF without establishing a new association. The context may be, for example, service description information and subscription information. Similarly, the SMF and the PCF may determine whether a new local NEF needs to be selected. For example, when UPFs that transmit these service data flows or DNAIs corresponding to these service flows are the same, it may be determined that a new local NEF does not need to be selected. That is, the local NEF corresponding to the service in this embodiment of this application may also be the local NEF corresponding to the DNAI.

It should be noted that examples in the application scenarios in this application merely show some possible implementations, to help better understand and describe the method in this application. A person skilled in the art may obtain examples of some evolution forms based on the communication method provided in this application.

In the foregoing embodiments provided in this application, the method provided in embodiments of this application is described from a perspective of a terminal and from a perspective of interaction between the terminal and a network device. To implement functions in the method provided in the foregoing embodiments of this application, the terminal may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 6:
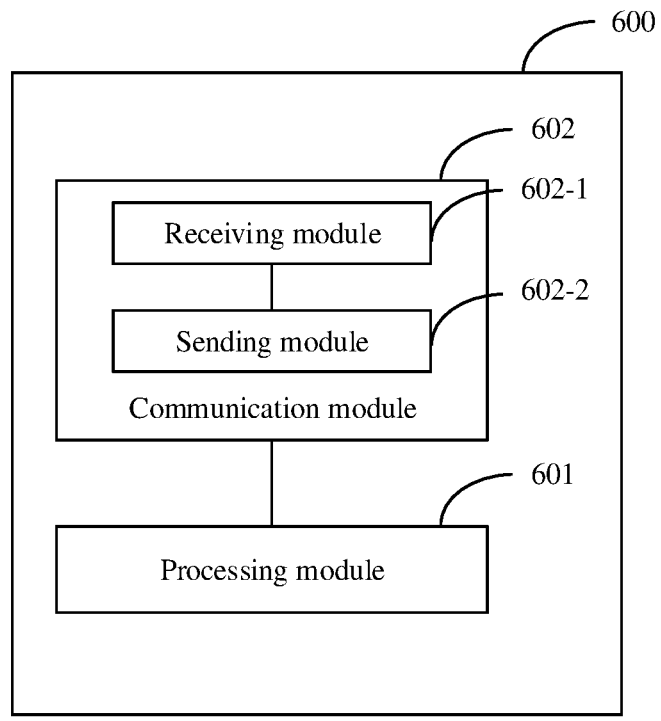
FIG. 6 is a schematic diagram 1 of a structure of a communication apparatus according to an embodiment of this application.

As shown in FIG. 6, based on a same technical concept, an embodiment of this application further provides a communication apparatus 600. The communication apparatus 600 may be an SMF, may be a local NEF, may be an apparatus in the SMF or the local NEF, or may be an apparatus that can be used together with the SMF or the local NEF. In a design, the communication apparatus 600 may include modules that are in a one-to-one correspondence with the methods/operations/steps/actions performed by the SMF or the local NEF in the foregoing method embodiments. The module may be implemented by a hardware circuit, software, or a combination of the hardware circuit and the software. In a design, the communication apparatus 600 may include a processing module 601 and a communication module 602. The processing module 601 is configured to invoke the communication module 602 to perform a receiving function and/or a sending function. The communication module 602 may further include a receiving module 602-1 and a sending module 602-2.

When the communication apparatus 600 is configured to perform an operation performed by a session management function SMF:

In an embodiment, the receiving module 602-1 is configured to receive indication information from a policy control function, where the indication information indicates the session management function to send an identifier of a user plane function to the policy control function, and the user plane function is configured to transmit data of a first service.

The sending module 602-2 is configured to send the identifier of the user plane function to the policy control function based on the indication information.

In another embodiment, the receiving module 602-1 is configured to receive indication information from a policy control function, where the indication information indicates exposure of information about a first service, the information about the first service is from a user plane function, and the user plane function is configured to transmit data of the first service.

The sending module 602-2 is configured to send an identifier of a first local network exposure function to the user plane function or send an identifier of the user plane function to the first local network exposure function based on the indication information.

The first local network exposure function is configured to expose information about the first service to a first local application function corresponding to the first service.

The receiving module 602-1 and the sending module 602-2 may be further configured to perform other operations performed by the SMF in the foregoing method embodiments. Details are not described herein again.

When the communication apparatus 600 is configured to perform an operation performed by a local network exposure function NEF:

The receiving module 602-1 is configured to receive first information, where the first information includes an identifier of a user plane function, and the user plane function is configured to transmit data of a first service.

The sending module 602-2 is configured to send a request message to the user plane function based on the first information, where the request message requests to establish an association between the local network exposure function and the user plane function; and the apparatus is configured to expose information about the first service to a local application function corresponding to the first service.

The receiving module 602-1 and the sending module 602-2 may be further configured to perform other operations performed by the local NEF in the foregoing method embodiments. Details are not described herein again.

Division into the modules in embodiments of this application is an example, is merely division into logical functions, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

Figure 7:
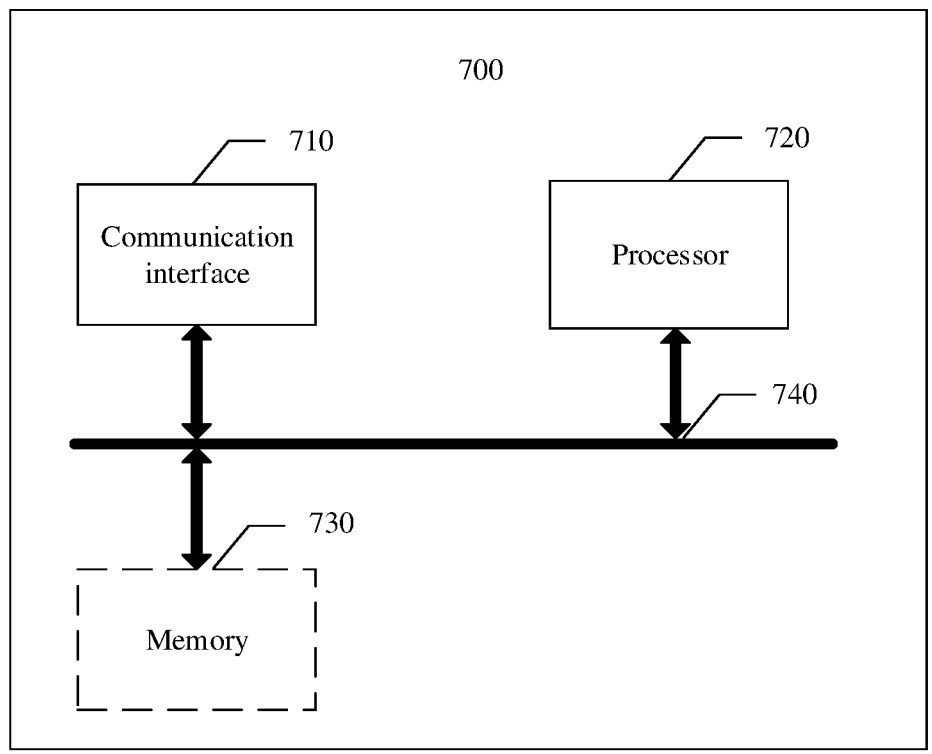
FIG. 7 is a schematic diagram 2 of a structure of a communication apparatus according to an embodiment of this application.

FIG. 7 shows a communication apparatus 700 according to an embodiment of this application. The communication apparatus 700 is configured to implement functions of function entities in the foregoing methods. The function entity may be, for example, an SMF or a local NEF. The communication apparatus may be a function entity, may be an apparatus in the function entity, or may be an apparatus that can be used together with the function entity. The communication apparatus 700 may be a chip system. In this embodiment of this application, the chip system may include a chip, or may include the chip and another discrete component. The communication apparatus 700 includes at least one processor 720, configured to implement the method provided in embodiments of this application. The communication apparatus 700 may further include a communication interface 710. In this embodiment of this application, the communication interface may be a transceiver, a circuit, a bus, a module, or a communication interface of another type, and is configured to communicate with another device via a transmission medium. For example, the communication interface 710 is used for an apparatus in the communication apparatus 700 to communicate with another device.

The processor 720 and the communication interface 710 may be configured to perform steps or operations performed by the function entities (such as the SMF or the local NEF) in the foregoing method embodiments. Details are not described herein again.

The communication apparatus 700 may further include at least one memory 730, configured to store program instructions and/or data. The memory 730 is coupled to the processor 720. The coupling in this embodiment of this application may be an indirect coupling or a communication connection between apparatuses, units, or modules in an electrical form, a mechanical form, or another form, and is used for information exchange between the apparatuses, the units, or the modules. The processor 720 may cooperate with the memory 730. The processor 720 may execute the program instructions stored in the memory 730. At least one of the at least one memory may be included in the processor.

A specific connection medium between the communication interface 710, the processor 720, and the memory 730 is not limited in this embodiment of this application. In this embodiment of this application, the memory 730, the processor 720, and the communication interface 710 are connected through a bus 740 in FIG. 7, and the bus is represented by a bold line in FIG. 7. A manner of a connection between other components is merely an example for description, and is not limited thereto. The bus may be classified into an address bus, a data bus, a control bus, and the like. For ease of representation, only one bold line is used for representation in FIG. 7, but this does not mean that there is only one bus or only one type of bus.

When the communication apparatus 600 and the communication apparatus 700 are specifically chips or chip systems, the communication module 602 and the communication interface 710 may output or receive baseband signals. When the communication apparatus 600 and the communication apparatus 700 are specifically devices, the communication module 602 and the communication interface 710 may output or receive radio frequency signals.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 730 may be a non-volatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

Some or all of operations and functions performed by the function entity (for example, the SMF or the local NEF) described in the foregoing method embodiments of this application may be implemented by using a chip or an integrated circuit.

To implement the functions of the communication apparatus in FIG. 6 or FIG. 7, an embodiment of this application further provides a chip, including a processor, configured to support the communication apparatus in implementing the functions of the function entities in the foregoing method embodiments. In a possible design, the chip is connected to a memory or the chip includes the memory, and the memory is configured to store program instructions and data that are necessary for the communication apparatus.

An embodiment of this application provides a computer-readable storage medium that stores a computer program. The computer program includes instructions used to perform the foregoing method embodiments.

An embodiment of this application provides a computer program product including instructions. When the computer program product is run on a computer, the foregoing method embodiments are performed.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

It is clear that a person skilled in the art can make various modifications and variations to embodiments of this application without departing from the spirit and scope of embodiments of this application. This application is intended to cover these modifications and variations provided that they fall within the scope of protection defined by the following claims and their equivalent technologies.

What is claimed is:

1. A communication method, comprising:
    receiving, by a session management function, indication information from a policy control function, wherein the indication information indicates exposure of information about a first service; and
    sending, by the session management function, an identifier of a first local network exposure function to a user plane function based on the indication information, wherein
    the first local network exposure function is configured to expose the information about the first service from the user plane function to a first local application function corresponding to the first service, and the user plane function is configured to transmit data of the first service.

2. The method according to claim 1, wherein the method further comprises:
    receiving, by the session management function, the identifier of the first local network exposure function from the policy control function.

3. The method according to claim 1, wherein the method further comprises:
    sending, by the session management function to the user plane function, an identifier of an N4 session corresponding to a protocol data unit (PDU) session, wherein the PDU session is used for transmitting the first service for a terminal device.

4. The method according to claim 1, wherein the sending of the identifier of the first local network exposure function includes sending an address of the first local network exposure function.

5. The method according to claim 1, wherein the sending the identifier of the first local network exposure function to the user plane function includes sending the identifier of the first local network exposure function to a local user plane function.

6. The method according to claim 1, wherein the receiving the indication information indicating exposure of the information about the first service includes receiving quality of service (QOS) monitoring information or QoS notification information corresponding to the first service.

7. A communication apparatus, comprising:
    memory is configured to store a program or instruction; and
    at least one processor, wherein the at least one processor is coupled to the memory, and in response to the program or the instructions being executed by the at least one processor, cause the at least one processor to perform the following:
    receiving indication information from a policy control function, wherein the indication information indicates exposure of information about a first service; and
    sending an identifier of a first local network exposure function to a user plane function based on the indication information, wherein
    the first local network exposure function is configured to expose the information about the first service from the user plane function to a first local application function corresponding to the first service, and the user plane function is configured to transmit data of the first service.

8. The apparatus according to claim 7, wherein the at least one processor is further configured to:
    receive the identifier of the first local network exposure function from the policy control function.

9. The apparatus according to claim 7, wherein the at least one processor is further configured to:
    send, to the user plane function, an identifier of an N4 session corresponding to a protocol data unit (PDU) session, wherein the PDU session is used for transmitting the first service for a terminal device.

10. The apparatus according to claim 7, wherein the identifier of the first local network exposure function includes an address of the first local network exposure function.

11. The apparatus according to claim 7, wherein the user plane function is a local user plane function.

12. The apparatus according to claim 7, wherein the information about the first service is quality of service (QOS) monitoring information or QoS notification information corresponding to the first service.

13. A communication method, comprising:
    sending, by a policy control function, indication information to a session management function, wherein the indication information indicates exposure of information about a first service;
    receiving, by the session management function, the indication information; and
    sending, by the session management function, an identifier of a first local network exposure function to a user plane function based on the indication information, wherein
    the first local network exposure function is configured to expose the information about the first service from the user plane function to a first local application function corresponding to the first service, and the user plane function is configured to transmit data of the first service.

14. The method according to claim 13, wherein the method further comprises:
   receiving, by the user plane function, the identifier of the first local network exposure function;
   sending, by the user plane function, the information about the first service to the first local network exposure function; and
   exposing, by the first local network exposure function, the information about the first service to a first local application function.

15. The method according to claim 13, wherein the method further comprises:
   sending, by the policy control function, the identifier of the first local network exposure function to the session management function;
   receiving, by the session management function, the identifier of the first local network exposure function.

16. The method according to claim 13, wherein the receiving the indication information indicating exposure of the information about the first service includes receiving quality of service (QOS) monitoring information or QoS notification information corresponding to the first service.

17. A communication system, comprising:
   a session management function;
   a policy control function;
   a user plane function; and
   a local network exposure function, wherein
   the policy control function is configured to send indication information to the session management function, wherein the indication information indicates exposure of information about a first service;
   the session management function is configured to receive the indication information, and send an identifier of the first local network exposure function to the user plane function based on the indication information;
   the user plane function is configured to receive the identifier of the first local network exposure function, and send the information about the first service to the first local network exposure function; and
   the first local network exposure function is configured to expose the information about the first service to a first local application function.

18. The system according to claim 17, wherein
   the policy control function is further configured to send the identifier of the first local network exposure function to the session management function; and
   the session management function is further configured to receive the identifier of the first local network exposure function.

19. The system according to claim 17, wherein the user plane function is a local user plane function.

20. The system according to claim 17, wherein the information about the first service is quality of service (QOS) monitoring information or QoS notification information corresponding to the first service.

* * * * *